(12) United States Patent
Olson

(10) Patent No.: US 7,188,808 B1
(45) Date of Patent: Mar. 13, 2007

(54) AERIALWIND POWER GENERATION SYSTEM AND METHOD

(76) Inventor: Gaylord G. Olson, 273 Jefferson Rd., Princeton, NJ (US) 08540

( * ) Notice: Subject to any disclaimer, the term of this patent is extended or adjusted under 35 U.S.C. 154(b) by 0 days.

(21) Appl. No.: 11/307,890

(22) Filed: Feb. 27, 2006

Related U.S. Application Data

(63) Continuation-in-part of application No. 11/164,512, filed on Nov. 28, 2005.

(51) Int. Cl.
*F03D 9/00* (2006.01)
*B64C 31/06* (2006.01)

(52) U.S. Cl. .................. 244/153 R; 290/55

(58) Field of Classification Search ........... 244/1 TD, 244/3, 33, 153 R, 153 A, 155 A; 290/44, 290/55
See application file for complete search history.

(56) References Cited

U.S. PATENT DOCUMENTS

| | | | |
|---|---|---|---|
| 2,400,400 A * | 5/1946 | Duer ..................... | 244/3 |
| 3,086,739 A | 4/1963 | Barber | |
| 3,227,398 A | 1/1966 | Struble | |
| 3,229,517 A | 1/1966 | Smith | |
| 3,887,817 A | 6/1975 | Steelman | |
| 3,924,827 A | 12/1975 | Lois | |
| 3,987,987 A | 10/1976 | Payne | |
| 4,073,516 A | 2/1978 | Kling | |
| 4,076,190 A | 2/1978 | Lois | |
| 4,084,102 A | 4/1978 | Fry | |
| 4,124,182 A | 11/1978 | Loeb | |
| 4,166,596 A * | 9/1979 | Mouton, Jr. et al. ......... | 244/30 |
| 4,285,481 A * | 8/1981 | Biscomb .................. | 244/33 |
| 5,931,416 A | 8/1999 | Carpenter | |
| 6,072,245 A | 6/2000 | Ockels | |
| 6,254,034 B1 | 7/2001 | Carpenter | |
| 6,523,781 B2 | 2/2003 | Ragner | |
| 6,616,402 B2 | 9/2003 | Selsam | |
| 6,781,254 B2 | 8/2004 | Roberts | |
| 6,925,949 B1 | 8/2005 | Phillips | |
| 2002/0167702 A1 | 11/2002 | Badesha et al. | |
| 2005/0046197 A1 | 3/2005 | Kingsley | |

* cited by examiner

*Primary Examiner*—Robert P. Swiatek
(74) *Attorney, Agent, or Firm*—Ancel W. Lewis, Jr.

(57) ABSTRACT

An aerial power generation system includes a guide line supported by a support body. Wind driven elements are configured and shaped to provide maximum force from both lift and drag during the downwind phase of operation and minimum force during the upwind phase. The guide lines add stability to the system and provide better control over angular orientation and direction of motion. Power transfer is through one or more tow lines connected from the driven elements to power generation devices on the ground. Another embodiment of the aerial power generation system includes a revolving apparatus and two or more wind powered driven elements connected by tow lines to the revolving apparatus. The method includes changing the driven elements between high and low force configurations for downwind and upwind operation, and flying the driven elements in a selected pattern perpendicular to the tow line.

9 Claims, 13 Drawing Sheets

US 7,188,808 B1

AERIAL WIND POWER GENERATION SYSTEM AND METHOD

This application is a continuation-in-part of Ser. No. 11/164,512 filed Nov. 28, 2005

TECHNICAL FIELD

The present invention relates to power generation and more particularly to systems and methods that convert wind energy acting on aerial wind driven elements to rotary or electrical power.

BACKGROUND ART

As fossil fuels become depleted and more expensive, the need for cost competitive methods and apparatus for harnessing renewable energy sources increases. The wind was long used for powering sailing ships and windmills, but the advent of steam engines or turbines, internal combustion engines, and gas turbines provided cheaper, more convenient energy sources. Less expensive and more efficient apparatus and methods for utilizing wind power would now be beneficial.

Windmills (or wind turbines) are currently being used to generate electricity and to drive pumps, however the cost to generate electricity with a windmill is still more expensive than the cost of electricity generated from fossil fuels. Windmills have a high capital cost relative to power generated. Wind speed, in general, is higher and more consistent with increasing altitude. There is potential to generate significant power with airborne or aerial apparatus at altitudes above the heights reasonably reachable by ground based windmills.

The challenge with wind power generation is to convert the linear power of the wind to rotary motion to drive an electrical generator or a pump. One known approach to aerial wind power generation is a tethered, aerial windmill. Such aerial windmills can be supported by lighter than air aircraft, such as a blimp, or by lift from airfoil wing structures. These aerial windmills are relatively heavy and require long, heavy electrical cables to transmit the generated power to ground level.

A second known approach to aerial wind power generation is a wind powered element, such as a kite, blimp or airfoil, that is connected to a tow line. The tow line wraps around a reel on the shaft of a ground level power generation device. As the wind powered element is pulled by the wind, the distance from the wind powered element to the shaft increases and the tow line rotates the reel and shaft to generate power. The angle of attack or the shape of the wind powered element is changeable so that the wind powered element can be reeled back towards the ground level power generation device with little power use.

A third known approach to aerial wind power generation is an endless chain of spaced kites linked to the shaft of a ground level power generation device. The kites follow an ascending path and a descending path. The kites are adjustable to provide higher lift while on the ascending path.

DISCLOSURE OF THE INVENTION

An aerial power generation system includes a guide line that extends skywards at a selected angle. The guide line is connected at the upper end to a support body. A wind powered driven element is slidably mounted on the guide line. The driven element uses a sail-like design with curvature about a horizontal axis so as to maximize the lift and drag wind forces or the driven element includes a rotatable hub with a plurality of airfoil blades. The driven element is connected by a tow line to a reel on a shaft of a means for generating power. Means are provided for changing the driven element from high force configurations to low force configurations.

Another aerial power generation system includes a plurality of wind powered driven elements connected by tow lines to spaced attachment points on a revolving apparatus that drives a means for generating power. A means for changing the driven elements between high force configurations and low force configurations changes each driven element to high force configurations when the respective attachment point is moving downwind and to low force configurations when the respective attachment point is moving upwind to cause rotation of the revolving apparatus. The driven elements are flown in a pattern at a high speed perpendicular to the tow line, when in the high force configurations, to increase the power generated.

Another aerial power generation system includes an airfoil driven element and a means for adjusting the elevation and azimuth angles of the driven element connected through a swivel to a tow line that is connected to a means for generating power. A method of aerial power generation includes flying the driven element at high speed perpendicular to the tow line in a selected pattern, such as a circle.

BRIEF DESCRIPTION OF THE DRAWINGS

Details of this invention are described in connection with the accompanying drawings that bear similar reference numerals in which.

DETAILED DESCRIPTION OF THE INVENTION

Figures 1, 2:
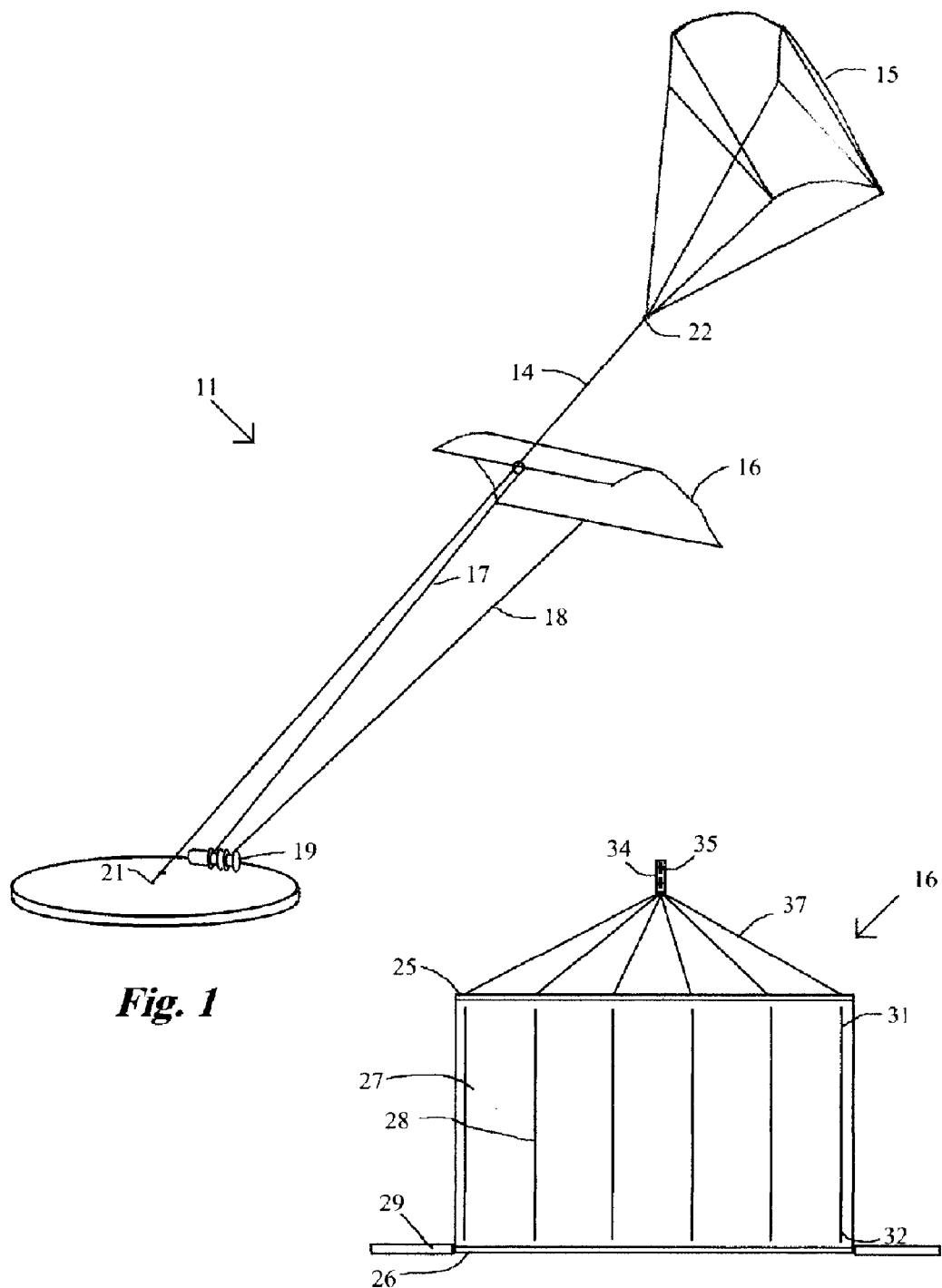
FIG. 1 is a perspective view of an aerial wind power generation system embodying features of the present invention.
FIG. 2 is a front elevation view of a driven element of the system of FIG. 1.

Referring now to FIG. 1, an aerial wind power generation system 11 embodying features of the present invention includes a first guide line 14, a first support body 15, a driven element 16, a first tow line 17, a second tow line 18 and a means for generating power 19. The first guide line 14 has a first end 21 that is tethered at the ground or to a structure, and the first guide line 14 extends skywardly at a selected elevation angle to a spaced second end 22 that is attached to the first support body 15. The first support body 15 is an aircraft that is lifted by the wind, such as a kite as shown, or a lighter than air aircraft, such as a blimp or a balloon. Preferably the lift of the first support body 15 can be varied to maintain the elevation angle of the first guide line 14.

The driven element 16 is slidably attached or mounted on the first guide line 14. The driven element 16 is a kite, sail, airfoil or other element that generates both drag and lift from the wind. The first and second tow lines 17 and 18 each connect at one end to the driven element 16. The first tow line 17, and generally the second tow line 18, connect to the means for generating power 19 to rotate the means for generating power 19 to generate power. The means for generating power 19 is generally positioned near the first end 21 of the first guide line 14, and can be an electrical generator, a rotary pump, a compressor or other rotary power generation equipment.

Figure 3:
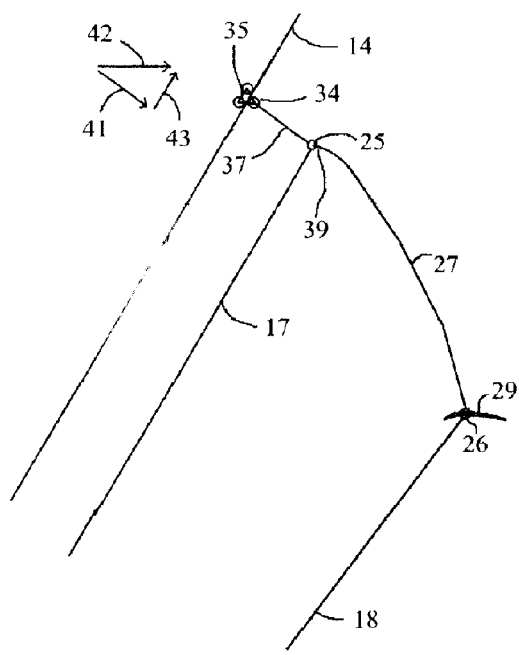
FIG. 3 is a side elevation view of a driven element of the system of FIG. 1, in a high force configuration.
Figure 4:
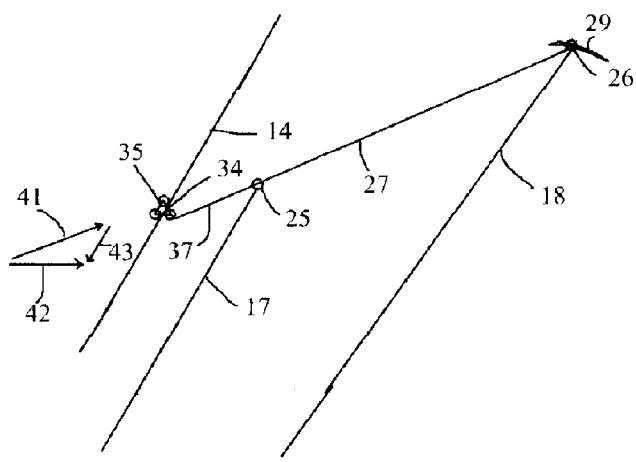
FIG. 4 is a side elevation view of a driven element of the system of FIG. 1, in a low force configuration.

FIGS. 2, 3 and 4 show a driven element 16 including an upper spar 25, a spaced, substantially parallel lower spar 26, and a generally rectangular, flexible fabric sail portion 27 extending between the upper and lower spars 25 and 26. The sail portion 27 includes a plurality of spaced, flexible, longitudinal spars or battens 28 transverse to the upper and lower spars 25 and 26. The battens 28 are shaped to curve the sail portion 27 into an airfoil shape with greater curvature near the upper spar 25 than near the lower spar 26 to provide increased lift force when needed. The battens 28 can be shaped to provide such curvature by tapering the upper ends 31 relative to the lower ends 32 to make the upper ends 31 more flexible, as in some sailboat or iceboat sails. Airfoils 29 can be provided if needed to enhance the stability and minimize drag when the driven element 16 is moving upwind. An airfoil 29 is shown attached to each end of the lower spar 26 and projects laterally therefrom to further control the shape of the driven element 16. The rotation angle of the airfoils 29 about a horizontal axis can be remotely controlled. The pair of airfoils 29 could also be used along the bottom edge of the sail and would thus be similar to conventional aircraft ailerons.

A pulley block 34 having three pulleys 35 in a triangular arrangement is slidably mounted onto the first guide line 14, with two pulleys 35 above and one pulley 35 below the first guide line 14. A plurality of support lines 37 attach to the pulley block 34, and diverge outwardly and downwardly therefrom to attach in a spaced arrangement along the upper spar 25 of the driven element 16. The first tow line 17 attaches to the upper spar 25 and the second tow line 18 attaches to the lower spar 26. Although a single driven element 16 is shown, a train or string of driven elements 16 can be used.

FIG. 3 shows the driven element 16 in a high force configuration. The wind acting on the driven element 16 is represented by an apparent wind vector 41. The apparent wind vector 41 is equal to the true wind vector 42 minus the driven element velocity vector 43. The first and second tow lines 17 and 18 are tensioned to bow the sail portion 27 into an airfoil shape and to position the sail portion 27 such that the leading edge 39 of the sail portion 27 points into the apparent wind vector 41. FIG. 4 shows the driven element 16 in a low force configuration. The second tow line 18 is lengthened relative to the first tow line 17, allowing the sail portion 27 to flatten and point into the apparent wind vector 41. The second tow line 18 acts as a control line.

Figure 5:
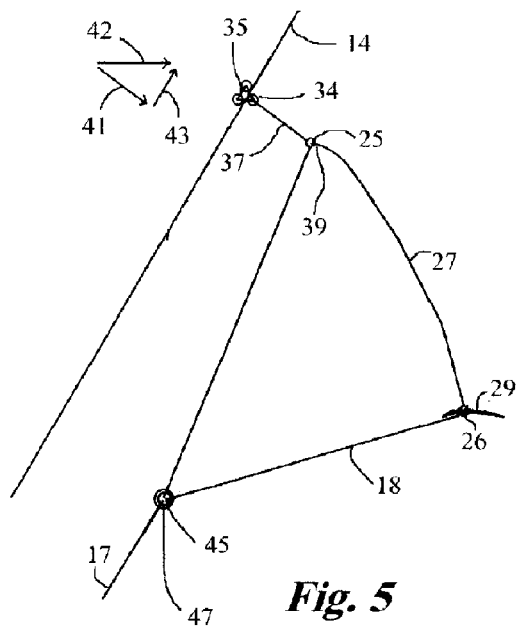
FIG. 5 is a side elevation view of a driven element of the system of FIG. 1, with an alternative control line arrangement.

In FIG. 1 the second tow line 18 extends to the means for generating power 19, and in combination with the means for generating power 19 forms a means for changing 45 the driven element 16 between high force and low force configurations. FIG. 5 shows an alternative means for changing 45 the driven element 16 between high force and low force configurations, with the second tow line 18 extending from the lower spar 26 of the driven element 16 to a remote control winch 47 that is mounted on the first tow line 17 and spaced from the upper spar 25 of the driven element 16. The winch 47 can include, by way of example and not as a limitation, a wind or solar powered electrical generator, batteries and a communications device for remote control. The winch 47 lengthens and shortens the second tow line 18. The winch 47 can be used in applications where the weight of the winch 47 is less than the weight of a second tow line 18 extending from the driven element 16 to the means for generating power 19.

Figure 6:
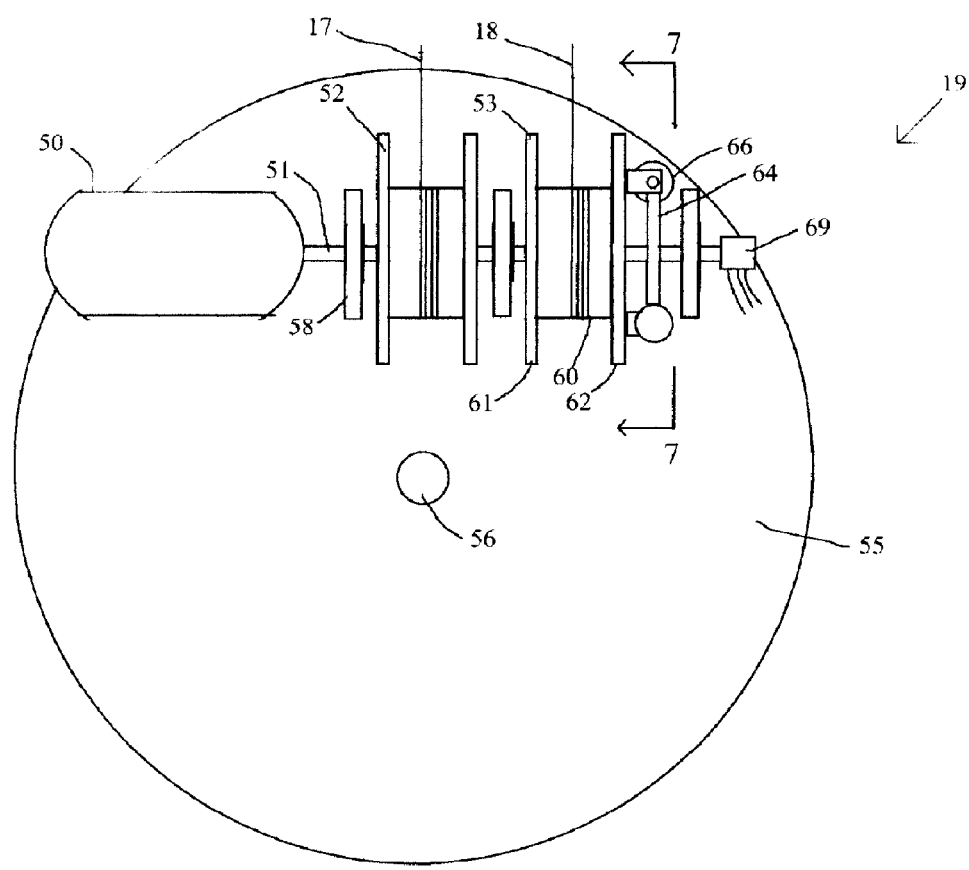
FIG. 6 is a top plan view of a means for generating power of the system of FIG. 1.
Figure 7:
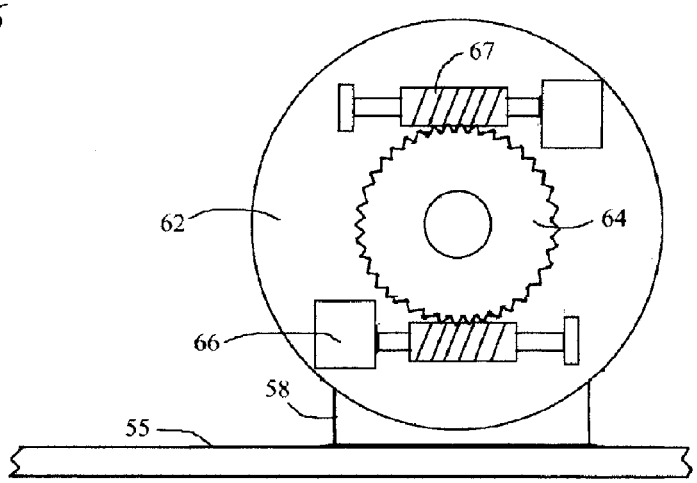
FIG. 7 is a sectional view taken along line 7—7 of FIG. 6.

Referring to FIGS. 6 and 7, the means for generating power 19 includes an electrical motor/generator 50 with a shaft 51 extending from one end, and spaced first and second reels 52 and 53 on the shaft 51. Preferably the means for generating power 19 is mounted on a rotating platform 55 that rotates about a pivot 56 to maintain the orientation of the power generation system 11 relative to the direction of the wind. The motor/generator 50 is rigidly mounted on the platform 55 with the shaft 51 being supported by spaced support bearings 58 that are also mounted on the platform 55. Three support bearings 58 are shown, with two support bearings 58 on the outer sides of the first and second reels 52 and 53, and one support bearing 58 between the first and second reels 52 and 53.

The first tow line 17 wraps around the first reel 52 and the second tow line 18 wraps around the second reel 53. The first reel 52 is rigidly attached to the shaft 51 and the second reel 53 is rotatably mounted on the shaft 51. The second reel 53 has cylindrical drum 60 mounted on the shaft 51 by bearings, and spaced first and second flanges 61 and 62 at opposite ends of the drum 60. A toothed gear 64 is rigidly attached to the shaft 51 and spaced from the second flange 62. Two control motors 66 are mounted on the outside of the second flange 62 on opposite sides of the shaft 51. A worm gear 67 is connected to and driven by each control motor 66, with the worm gears 67 being parallel and meshing to opposite sides of the toothed gear 64. Two motors are used to provide good mass balance of the reel assembly and thus allow for higher rotation rates. Slipring assemblies 69 on the end of shaft 51 opposite the motor/generator 50 and inside the drum 60 provide power to the control motors 66. Driving the control motors 66 rotates the second reel 53 relative to the first reel 52, lengthening or shortening the second tow line 18 relative to the first tow line 17, thereby providing a means for changing 45 the driven element 16 between high force and low force configurations. Therefore, the second reel 53, toothed gear 64, worm gears 67 and control motors 66 form a means for shortening and lengthening the second tow line 18 relative to the first tow line 17. Alternatively, the means for generating power 19 could include two independent, vertically stacked motor/generators to provide a means for changing 45 the driven element 16 between high force and low force configurations.

The first guide line 14 provides stability to the driven element 16, allowing the use of driven elements 16 with higher power and less stability than the driven elements 16 that could be used without the first guide line 14. The first guide line 14 also guides the driven element 16 along a path having a selected elevation angle, so that the power of the driven element 16 can be further optimized.

Figure 8:
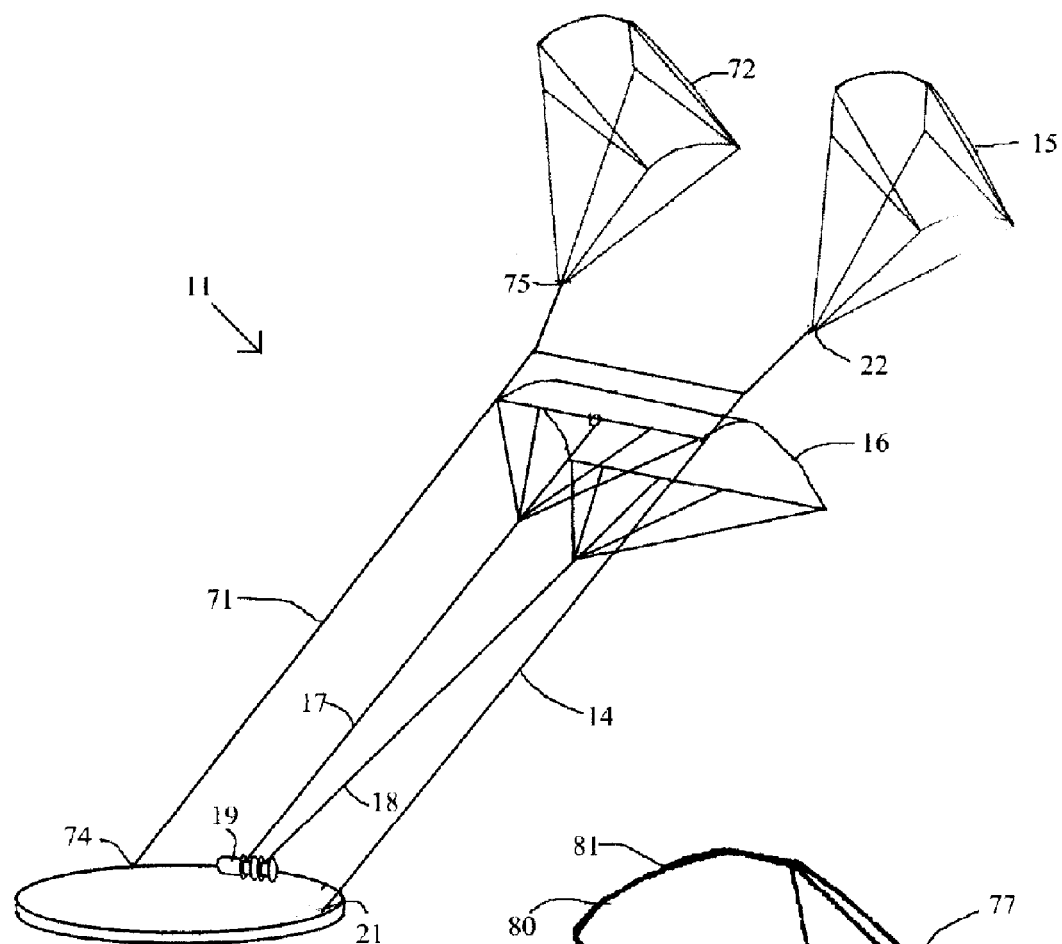
FIG. 8 is a perspective view of another aerial wind power generation system embodying features of the present invention, with two guide lines.

FIG. 8 shows an aerial wind power generation system 11 embodying features of the present invention including a first guide line 14, a second guide line 71, a first support body 15, a second support body 72, a driven element 16, a first tow line 17, a second tow line 18 and a means for generating power 19. The first guide line 14 has a first end 21 that is tethered at the ground or to a structure, and the first guide line 14 extends skywardly at a selected elevation angle to a spaced second end 22 that is attached to the first support body 15. The second guide line 71 has a first end 74 that is tethered at the ground or to a structure, and the second guide line 71 extends skywardly, spaced from and generally parallel to the first guide line 14, at a selected elevation angle to a spaced second end 75 that is attached to the second support body 72. The first and second support bodies 15 and 72 are each an aircraft that is lifted by the wind, such as a kite as shown, or a lighter than air aircraft, such as a blimp or a balloon. Preferably the lift and angle of attack of the first and second support bodies 15 and 72 can be varied to maintain an optimum elevation angle of the first and second guide lines 14 and 71.

Figure 9:
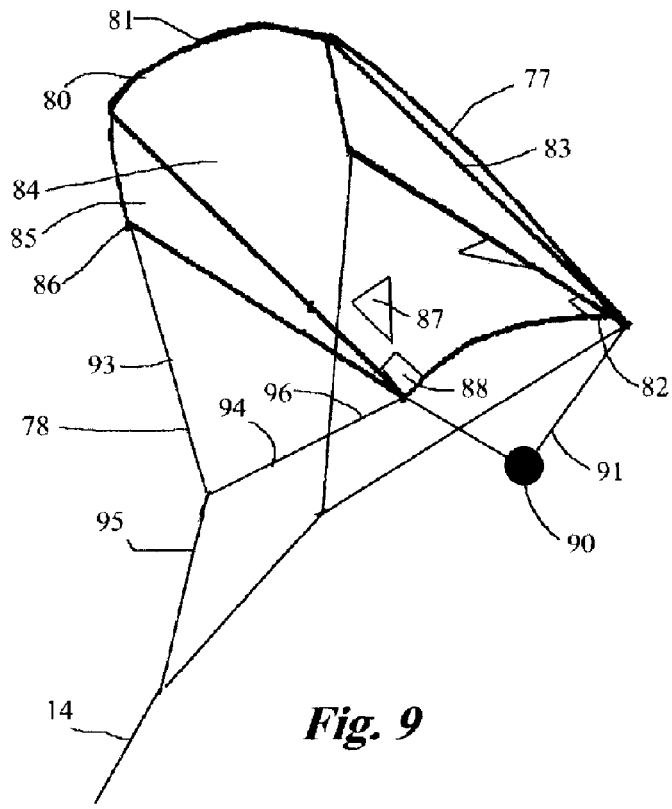
FIG. 9 is a perspective view of a support body of FIG. 8.

Referring to FIG. 9, the first support body 15 includes a kite 77 and a bridle 78. The kite 77 is generally a modified sled kite and has a substantially rectangular framework 80 with a top spar 81, a spaced bottom spar 82, and two spaced, parallel side spars 83 that extend from the top spar 81 to the bottom spar 82. A sail portion 84 covers the framework 80 and has equal triangular wings 85 extending laterally beyond the side spars 83. The outward corners 86 of the wings 85 are located significantly nearer to the top spar 81 than to the bottom spar 82. A pair of spaced, triangular holes 87 are located in the sail portion 84 near the bottom spar 82 to add stability to the kite 77.

A winch 88 is mounted in each lower corner of the framework 80. Wires 91 extend from each winch 88 to a control module 90, suspending the control module 90 below the bottom 82, intermediate the winches 88, and connecting the control module 90 to the two winches 88. The suspended control module 90 acts as a tail for the kite 77, increasing the stability of the kite 77. The control module 90 can include, by way of example, and not as a limitation, a two way radio link to the ground, a rechargeable battery, a wind or solar battery charging device, measurement devices and aircraft warning lighting. The measurement devices can include wind speed, light, altitude, GPS, three dimensional acceleration, temperature, humidity, and orientation sensing and measurement.

The bridle 78 includes two each upper bridle lines 93, lower bridle lines 94 and common bridle lines 95. One end of each upper bridle line 93 connects to an outward corner 86 of a wing 85 of the sail portion 84. One end of each lower bridle line 94 connects to a winch 88. The other ends of the upper and lower bridle lines 93 and 94 on each side of the kite 77 connect together and to one end of a common bridle line 95. The other ends of the common bridle lines 95 connect together and to the second end 22 of the first guide line 14. The lower bridle lines 94 in combination with the winches 88 can vary the angle of attack of the kite 77 relative to the wind, thereby forming a means for varying lift 96 (or drag) of the kite 77. Differential control of the lower bridle line lengths will allow for azimuth angle control with respect to the wind direction. Although first support body 15 is shown, second support body 72 will be substantially identical. Although a single kite 77 is shown, a train of kites 77 can be used to form the first or second support body 15 or 72.

Figure 10:
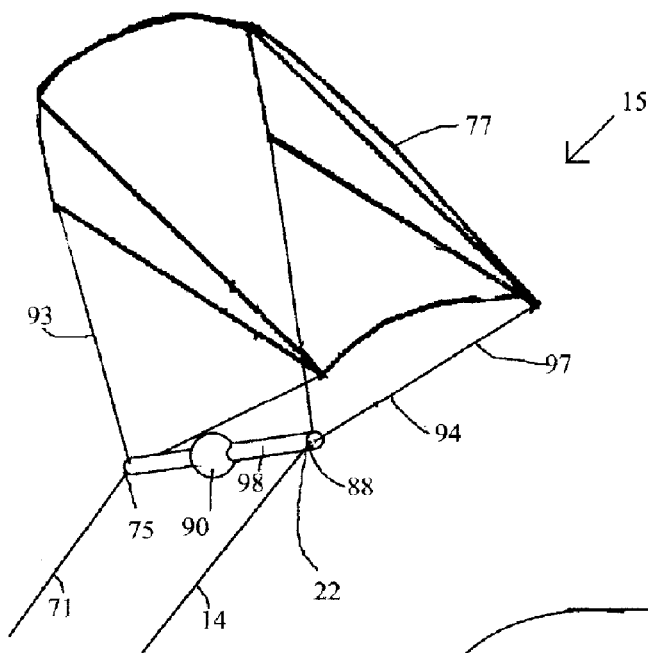
FIG. 10 is a perspective view of another support body for the system of FIG. 8.

FIG. 10 shows the kite 77 with a modified bridle 97 for providing support to both the first and second guide lines 14 and 71. One end of each upper bridle line 93 connects to an outward corner 86 of a wing 85 of the sail portion 84. One end of each lower bridle line 94 connects to an end of the bottom spar 82 of the framework 80 of the kite 77. A tube 98, sized to extend between the first and second guide lines 14 and 71, has the control module 90 incorporated into the middle and the winches 88 incorporated into opposite ends. The other ends of the upper bridle lines 93 connect to opposite ends of the tube 98. The other end of each of the lower bridle lines 94 connects to a winch 88. The second end 22 of the first guide line 14 connects to one end of the tube 98 and the second end 75 of the second guide line 71 connects to the opposite end of the tube 98. The winches 88 shorten or lengthen the lower bridle lines 94 to vary the angle of attack of the kite 77 relative to the wind.

Figure 11:
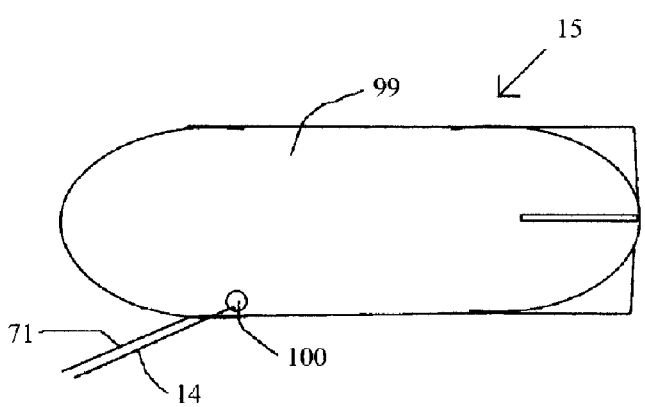
FIG. 11 is a side elevation view of another support body for the system of FIG. 8.

As shown in FIG. 11, the first support body 15 can be a blimp 99 with a transverse support bar 100. The second end 22 of the first guide line 14 connects to one end of the support bar 100 and the second end 75 of the second guide line 71 connects to the opposite end of the support bar 100. The use of the blimp 99 eliminates the need to bring the aerial portions of the power generation system 11 to the ground during low wind conditions and may allow for larger scale systems with higher power generation.

Figure 12:
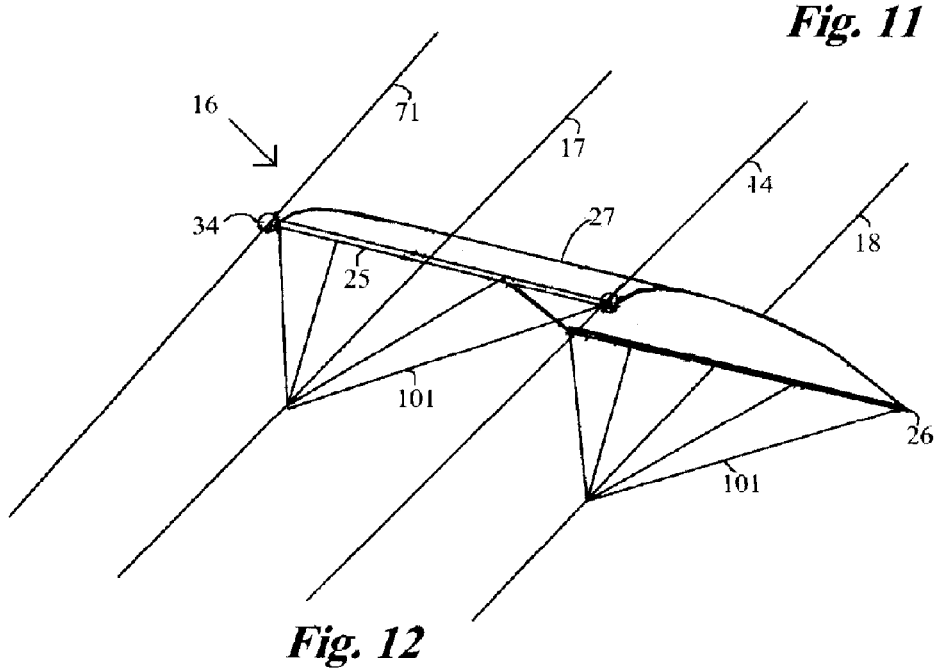
FIG. 12 is a perspective view of a driven element for the system of FIG. 8.

FIG. 12 shows the driven element 16 with pulley blocks 34 at opposite ends of the upper spar 25 to slidably mount the driven element 16 on the spaced first and second guide lines 14 and 71. A plurality of bridle lines 101 attach at one end in a spaced arrangement to the upper spar 25 and converge to attach to the first tow line 17. A plurality of bridle lines 101 attach at one end in a spaced arrangement to the lower spar 26 and converge to attach to the second tow line 18. The first and second tow lines 17 and 18 are shown extending beyond the driven element 16 and may attach to additional driven elements 16 that are above and downwind from the shown driven element 16.

Figure 13:
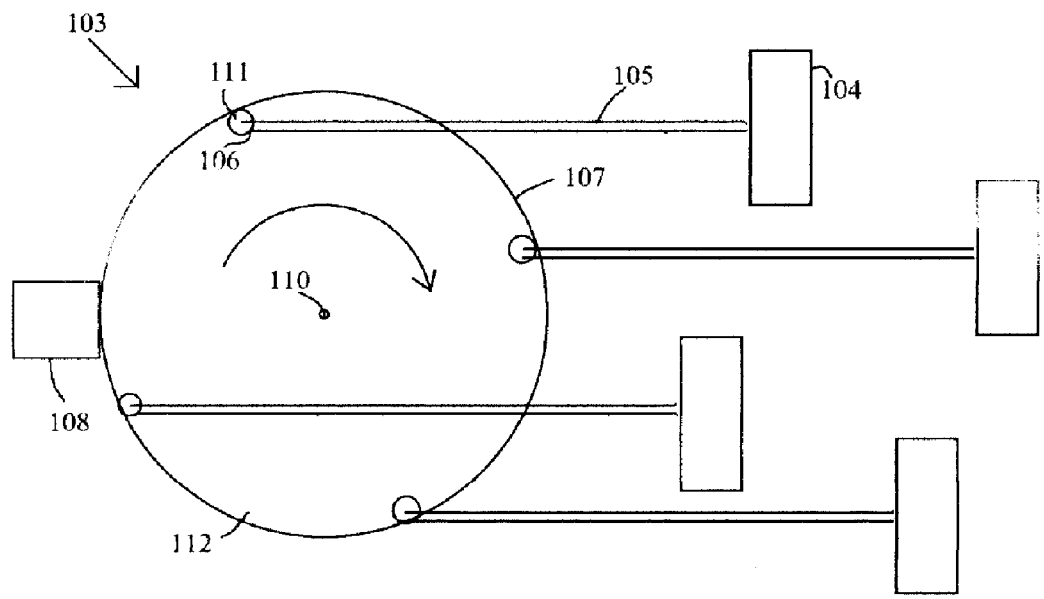
FIG. 13 is a top schematic view of another aerial wind power generation system embodying features of the present invention.

Referring to FIG. 13, an aerial wind power generation system 103 embodying features of the present invention includes a plurality of aerial wind powered driven elements 104, a tow line 105 for each of the driven elements 104, a means for changing 106 each of the driven elements 104 individually between high force and low force configurations, a revolving apparatus 107, and a means for generating power 108. The revolving apparatus 107 has a center 110 and, for each driven element 104, a tow line attachment point 111. The revolving apparatus 107 is represented by circle 112 and the tow line attachment points 111 are evenly spaced around the periphery of the revolving apparatus 107. One end of each tow line 105 connects to a driven element 104 and the other end of each tow line 105 connects to a tow line attachment point 111. The means for generating power 108 is linked to and driven by the revolving apparatus 107. The means for generating power 108 can be directly connected or can be linked by gears, belts, driveshafts or other means, and might be located near the center 110 and driven by a rotating shaft below the revolving apparatus 107.

Figure 14:
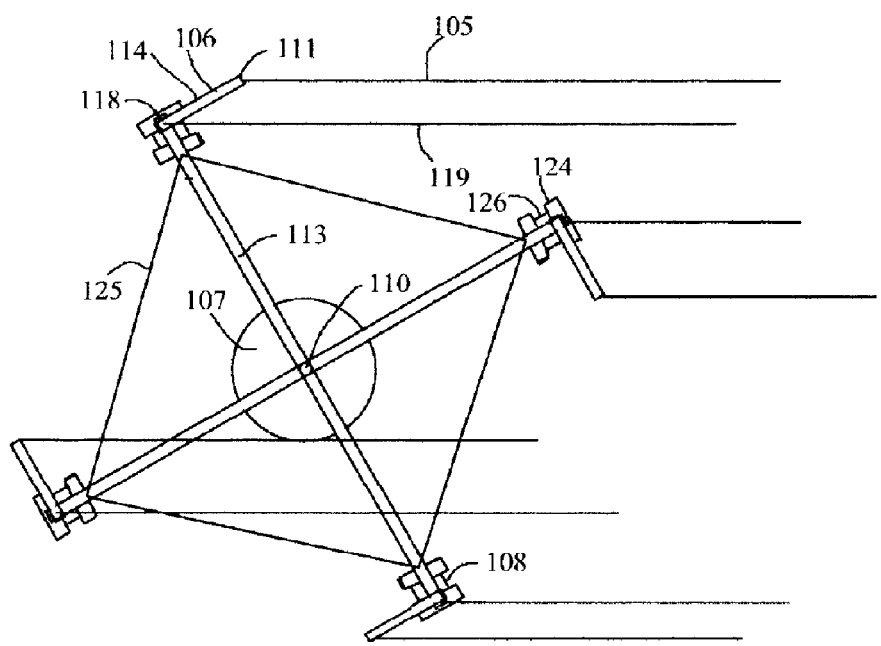
FIG. 14 is a top plan view of a revolving apparatus of the system of FIG. 13.
Figure 15:
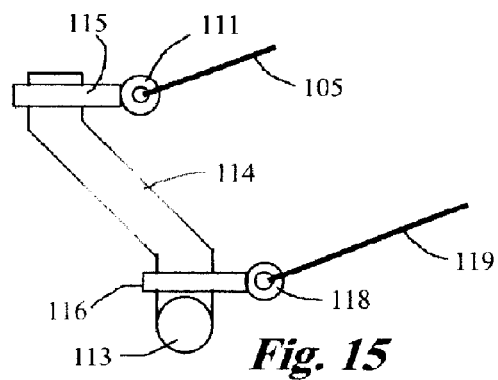
FIG. 15 is a partial side elevation view of the revolving apparatus of the system of FIG. 14.

FIGS. 14 and 15 show a revolving apparatus 107 with four cross bars 113 projecting horizontally from the center 110, and spaced ninety degrees from each other. At the end of each cross bar 113, opposite the center 110, an upright member 114 projects upwardly and transversely. An upper rotating collar 115 rotates around the upper end of each upright member 114 and a lower rotating collar 116 rotates around the lower end of each upright member 114. The upper rotating collar 115 provides the tow line attachment point 111. The lower rotating collar 116 provides a control line attachment point 118 for one end of a control line 119. The opposite end of the control line 119 connects to the driven element 104.

Figure 16:
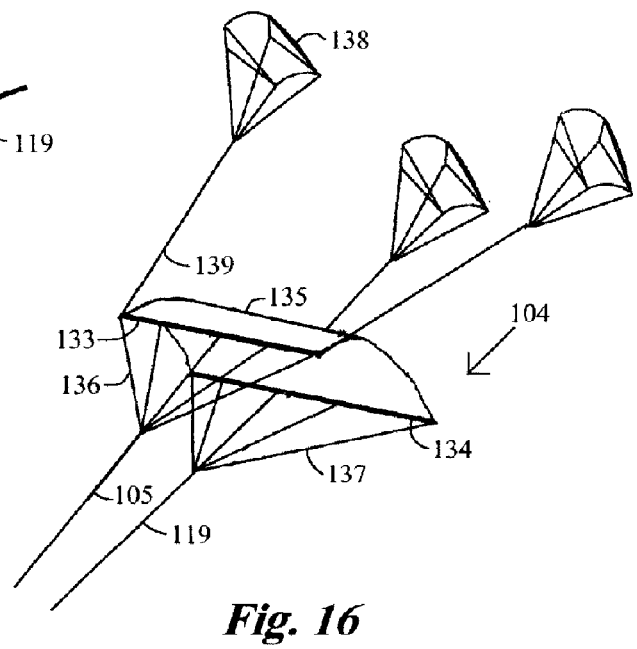
FIG. 16 is a perspective view of a driven element of the system of FIG. 13.

As shown in FIG. 16, a driven element 104 includes an upper spar 133, a lower spar 134 spaced from the upper spar 133, and a rectangular sail portion 135 extending between the upper and lower spars 133 and 134. A plurality of upper bridle lines 136 connect in a spaced arrangement to the upper spar 133 and converge to connect to the tow line 105. A plurality of lower bridle lines 137 connect in a spaced arrangement to the lower spar 134 and converge to connect to the control line 119. Three sled kites 138 are connected to the driven element 104 by support lines 139, to increase stability and support, with a kite 138 connecting to each end of the upper spar 133 and one kite 138 connecting to the middle of the lower spar 134. The angle of attack of the driven element 104 relative to the wind changes as the tow line 105 and control line 119 are pulled in or let out relative to each other, changing the driven element between high force and low force configurations. A similar change in the angle of attack of the kites 138, as described above, might also be used in synchronization with the changes in the driven element 104. The driven element 104 can also be an inline train of sled kites 138. The sled kites 138 can be radio controlled or controlled by multiple lines to the ground.

Referring to FIG. 14, when a cross bar 113 is moving directly downwind, the respective upright member 114 projects downwind. At this position the end of the cross bar 113 has the longest distance, relative to other points of rotation of the revolving apparatus 107, to the attachment of the tow line 105 to the upper bridle lines 136. The lengths of the tow line 105 and control line 119 are tailored so that the driven element 104 is in the highest force configuration when the end of the cross bar 113 is moving directly down wind. The cross bar 113 moving directly upwind has the shortest distance, relative to other points of rotation of the revolving apparatus 107, from the end of the cross bar 113 to the attachment of the tow line 105 to the upper bridle lines 136 and this is the position of the lowest force configuration. The upright member 114 and control line 119 provide the means for changing 106. The driven elements 104 are pulled downwind by the wind in high force configurations and upwind by the revolving apparatus 107 in low force configurations, causing the revolving apparatus 107 to revolve and to drive the means for generating power 108.

The means for changing 106 can be a remote control system as described above or other mechanical means for lengthening and shortening the tow line 105 and control line 119 relative to each other. The means for generating power 108 can be an electrical generator, a liquid pump, a compressor or other power transfer device. The power generation system 103 can be scaled from smaller to larger sizes. For smaller sizes of the power generation system 103, the cross bars 113 of the revolving apparatus 107 can be self supporting. Larger versions of the power generation system 103 could have the revolving apparatus 107 as large as a revolving agricultural irrigation system. The cross bars 113 of a large revolving apparatus 107 can be supported by wheels 124 and linked by cables 125. The wheels 124 can carry and drive a generator 126.

Figure 17:
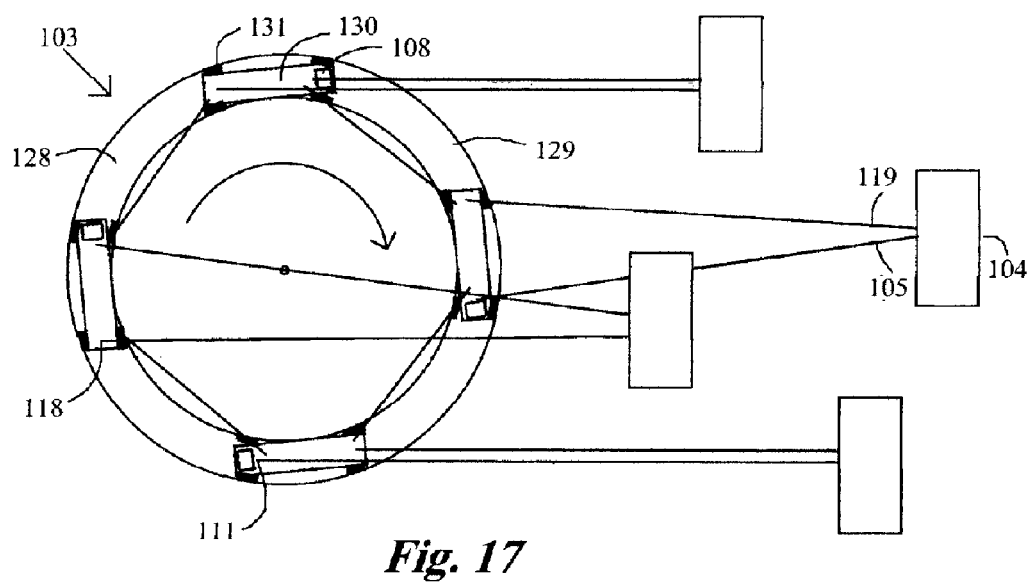
FIG. 17 is a top plan view of another revolving apparatus of the system of FIG. 13.

FIG. 17 shows an aerial wind power generation system 103 with another revolving apparatus 128 having an endless, closed track 129 with a plurality of spaced, linked cars 130 on the track. The track 129 can be a railroad type track and the cars 130 can be similar to railroad cars. The track 129 does not have to have a circular shape and can be shaped to optimize power generation. Generally, the means for generating power 108 is carried on the cars 130 and connected to wheels 131 to generate power. The tow line 105 attaches forwardly on the car 130 and the control line 119 attaches rearwardly on the car 130, to change the driven element between high force and low force configurations as the cars 130 travel around the track. The aerial wind power generation system 103 could alternatively have a revolving apparatus with a plurality of towers with bullwheels similar to ski chairlifts and aerial trams. A cable could pass around the bullwheels in a generally circular path with tow lines 105 and control lines 119 attaching to the cable.

Figure 18:
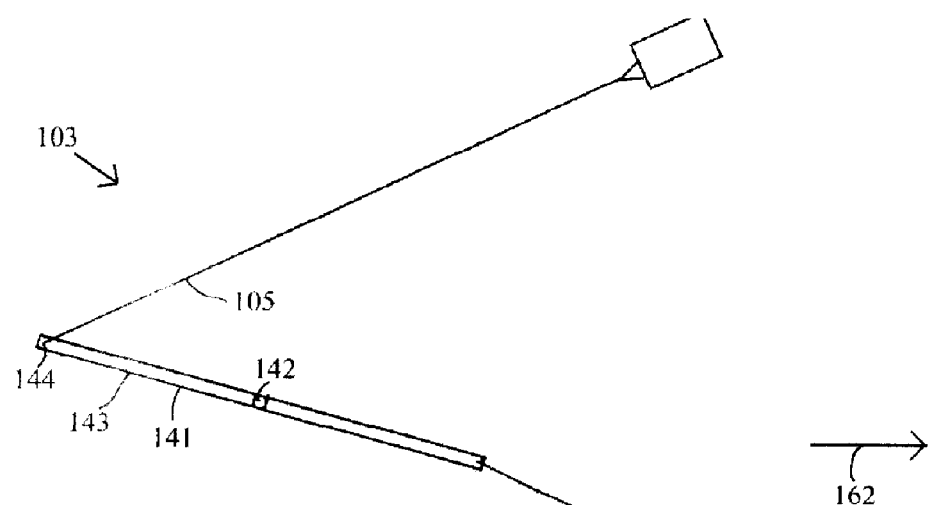
FIG. 18 is a top plan view of another revolving apparatus of the system of FIG. 13.
Figure 19:
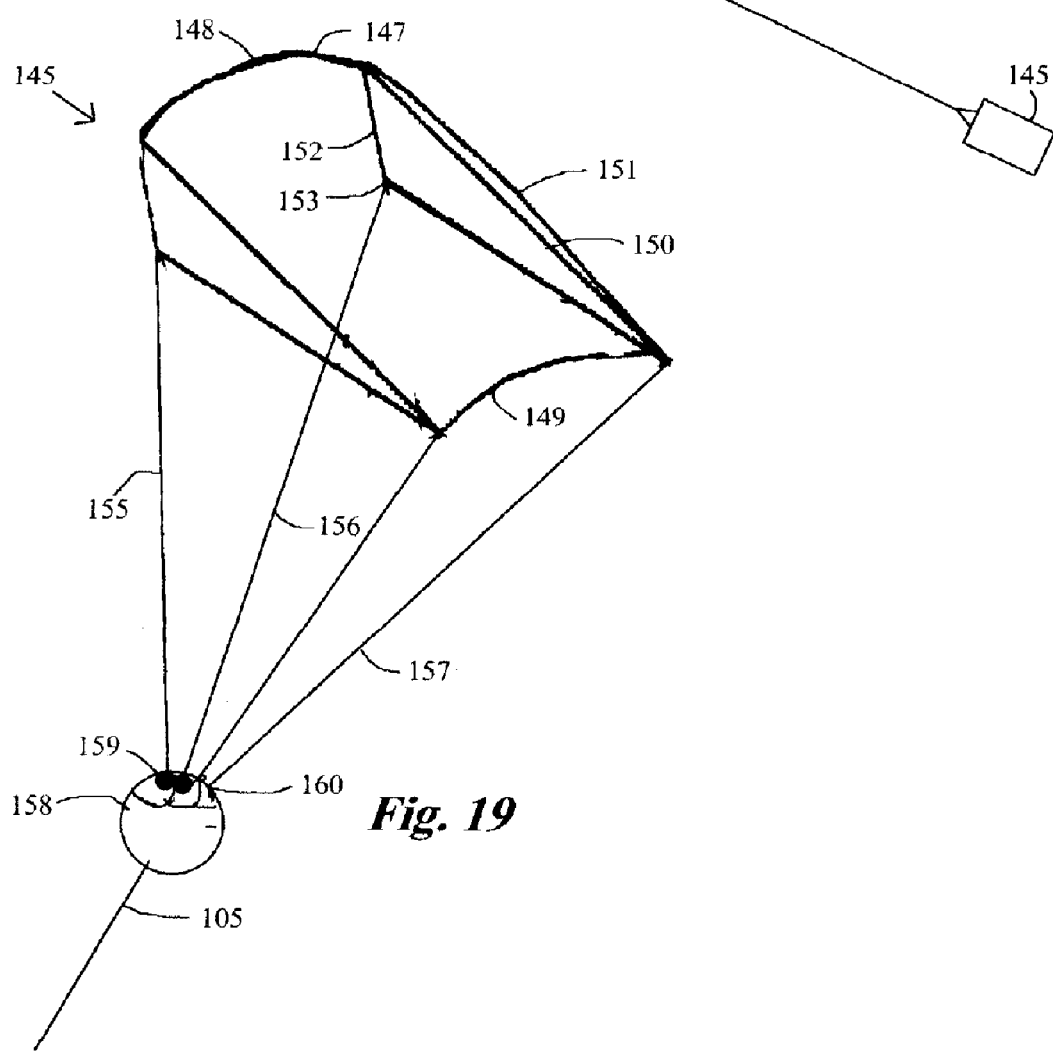
FIG. 19 is a perspective view of a driven element for the revolving apparatus of FIG. 18.

FIG. 18 shows an aerial wind power generation system 103 with another revolving apparatus 141 having a center 142 with a pair of cross bars 143 projecting horizontally in opposite directions from the center 142. A tow line attachment point 144 is provided at the end of each cross bar 143, opposite the center 142. A tow line 105 connects a driven element 145 to each tow line attachment point 144. Referring to FIG. 19, the driven element 145 shown is a modified sled kite and has a substantially rectangular framework 147 with a top spar 148, a spaced bottom spar 149, and two spaced, parallel side spars 150 that extend from the top spar 148 to the bottom spar 149. A sail portion 151 covers the framework 147 and has equal triangular wings 152 extending laterally beyond the side spars 150. The outward corners 153 of the wings 152 are located significantly nearer to the top spar 148 than to the bottom spar 149.

A bridle 155 for the driven element 145 includes two upper bridle lines 156 and two lower bridle lines 157. The upper bridle lines 156 connect at one end to corners 153, and the lower bridle lines 157 connect at one end to opposite ends of the bottom spar 149. A generally spherical control module 158 incorporates four winches 159 with the opposite ends of the upper and lower bridle lines 156 and 157 each connecting to a separate winch 159. The control module 158 connects to the upper end of a tow line 105. The control module 158 is remotely controlled and can change the length of each of the upper and lower bridle lines 156 and 157 independently. The control module 158 and the upper and lower bridle lines 156 and 157 provide a means for changing 106 the driven element 145 between high force and low force configurations, and a means for adjusting 160 the azimuth angle of the driven element 145.

Figure 20:
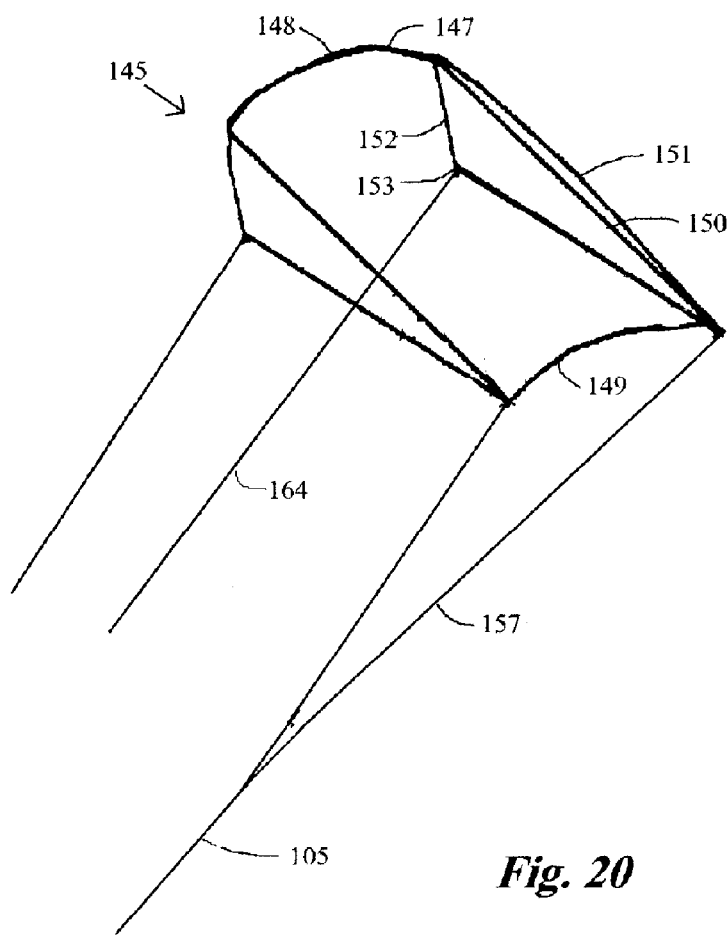
FIG. 20 is a perspective view of the driven element of FIG. 19 with a modified line configuration.

FIG. 20 shows an alternative configuration for driven element 145 with the two lower bridle lines 157 connecting to the tow line 105. Two spaced upper control lines 164 replace the two upper bridle lines 156, each connecting from a corner 153 of a wing 152 of the sail portion 151 to the end of the cross bar 143 that is opposite the center 142. The two upper control lines 164 are independently controlled so that the elevation and azimuth angles can be independently adjusted. This arrangement, with the lower bridle lines 157 connected to the tow line 105 and the two independently controlled upper control lines 164, provides another structure for the means for changing 106 the driven element 145 between high force and low force configurations, and another structure for the means for adjusting 160 the azimuth angle of the driven element 145.

Referring again to FIG. 18, the direction of the wind is shown by wind vector 162. By varying the azimuth angle of the driven elements 145, the driven elements 145 can fly at an angle relative to the wind vector 162. Each driven element 145 is changed to a high force configuration for a selected portion of the rotation of the respective tow line attachment point 144, where the selected portion is an arc of more than 180 degrees. The azimuth angle of the driven elements 145 is adjusted through this selected portion so that the driven elements 145, through the tow lines 105, each generate torque on the cross bars 143 throughout the selected portion. By generating torque for more than 180 degrees, the driven elements 145 generate more power than would be generated without a means for adjusting 160 the azimuth angle of the driven element 145.

Figure 21:
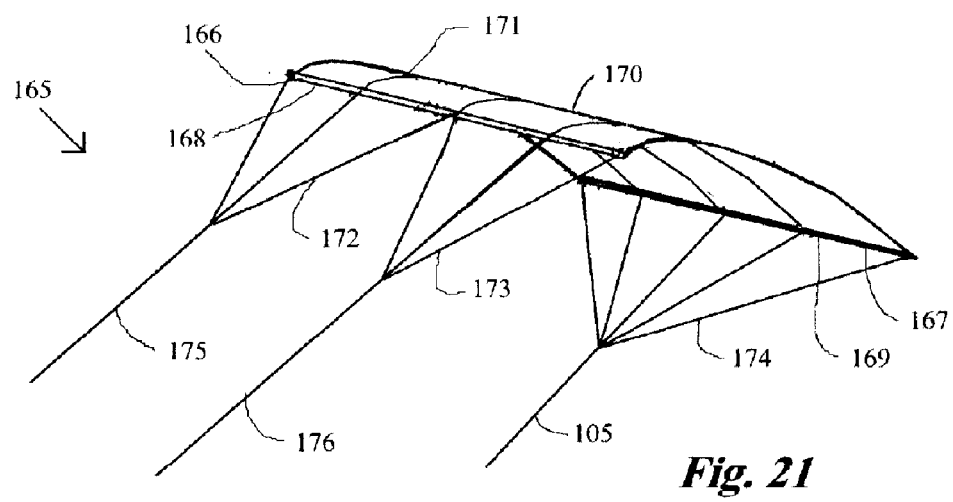
FIG. 21 is a perspective view of another driven element for the revolving apparatus of FIG. 18.

FIG. 21 shows another driven element 165 having a leading edge 166 and a trailing edge 167. The driven element 165 includes an upper spar 168 at the leading edge 166, a lower spar 169 at the trailing edge 167, spaced from the upper spar 168, and a rectangular sail portion 170 extending between the upper and lower spars 168 and 169. The sail portion 170 includes a plurality of spaced, flexible, longitudinal spars or battens 171 transverse to the upper and lower spars 168 and 169. The battens 171 are shaped to curve the sail portion 170 into an airfoil shape with greater curvature near the upper spar 168 than near the lower spar 169 to provide increased lift force when needed. A plurality of first upper bridle lines 172 connect in a spaced arrangement to one half of the upper spar 168 and a plurality of second upper bridle lines 173 connect in a spaced arrangement to the other half of the upper spar 168. A plurality of lower bridle lines 174 connect in a spaced arrangement to the lower spar 169.

The first upper bridle lines 172 converge to connect to a first upper control line 175 and the second upper bridle lines 173 converge to connect to a second upper control line 176. The lower bridle lines 174 converge to connect to the tow line 105. The first and second upper control lines 175 and 176, and the tow line 105 connect to the end of the cross bar 143 that is opposite the center 142. The first and second upper control lines 175 and 176 are independently controlled so that the elevation and azimuth angles can be independently adjusted. This arrangement, with the lower bridle lines 174 connected to the tow line 105 and the independently controlled first and second upper control lines 175 and 176, provides another structure for the means for changing 106 the driven element 165 between high force and low force configurations, and another structure for the means for adjusting 160 the azimuth angle of the driven element 165.

Figure 22:
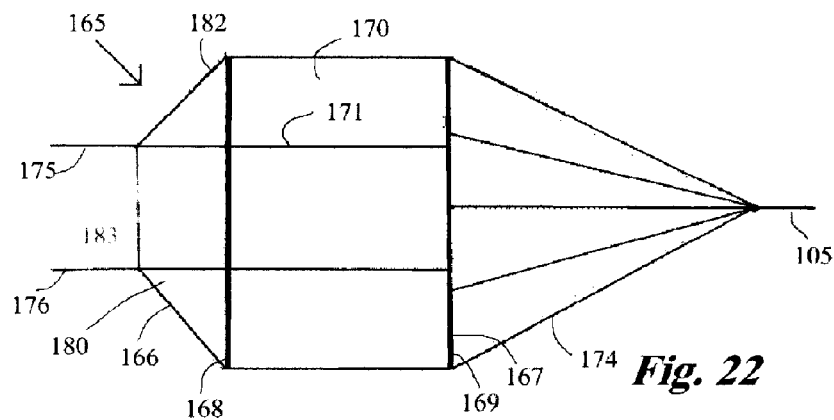
FIG. 22 is a top view of a variation of the driven element of FIG. 21.

FIG. 22 shows a variation of the driven element 165 where the first and second upper bridle lines 172 and 173 are replaced by an extension 180 of the sail portion 170, that forms the leading edge 166. The extension 180 extends from the upper spar 168 and has a trapezoidal shape with two spaced side edges 182 that slope inwardly from opposite ends of the upper spar 168 to a top edge 183 that is spaced from and parallel with the upper spar 168. The battens 171 extend into the extension 180 to the top edge 183. The first and second upper control lines 175 and 176 attach near opposite ends of the top edge 183.

Figure 23:
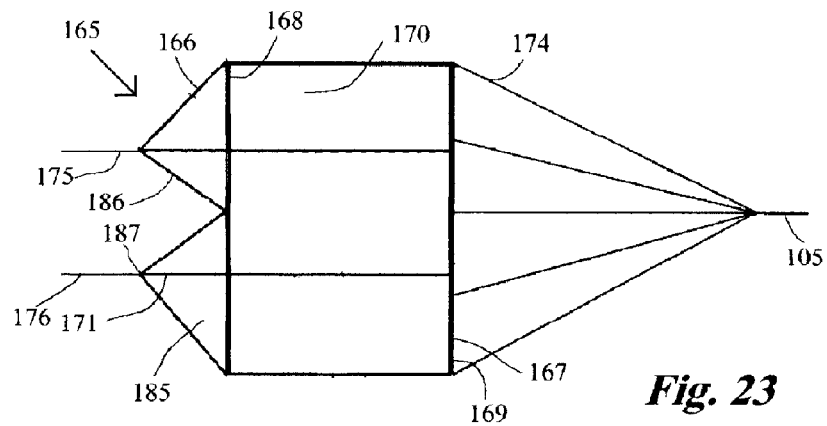
FIG. 23 is a top view of another variation of the driven element of FIG. 21.

FIG. 23 shows another variation of the driven element 165 where the first and second upper bridle lines 172 and 173 are replaced by a pair of triangular extensions 185 of the sail portion 170 that extend from the upper spar 168 and form the leading edge 166. The extensions 185 each have a pair of side edges 186 that slope inwardly from the upper spar 168 to converge at a corner 187. A batten 171 extends into each extension 185 to or near to the corner 187. The first and second upper control lines 175 and 176 each attach to a corner 187.

Figure 24:
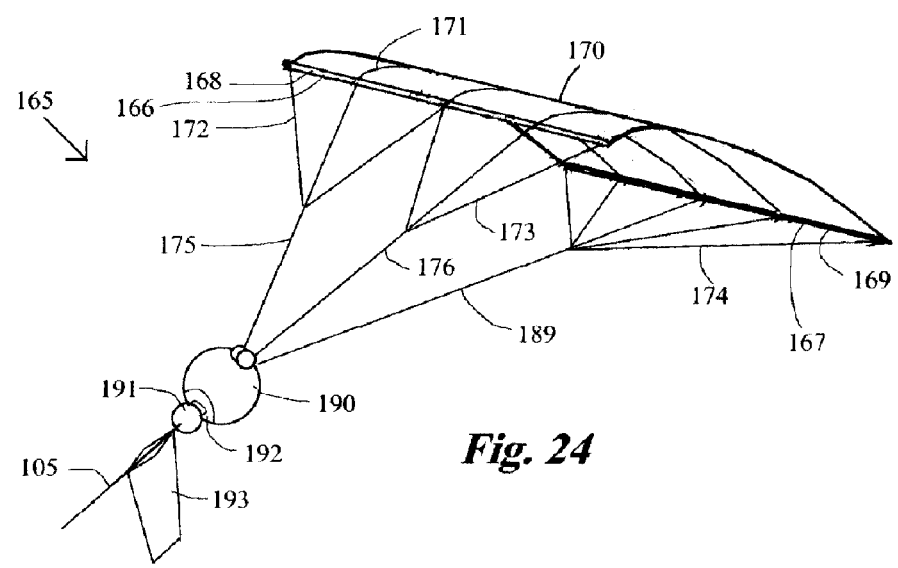
FIG. 24 is a perspective view of the driven element of FIG. 21 with a modified line configuration.

FIG. 24 shows another variation of the driven element 165 where the lower bridle lines 174 converge to connect to a lower control line 189. The first and second upper control lines 175 and 176, and the lower control line 189 all connect to a control module 190. The control module 190 connects to the tow line 105 through a swivel 191. The control module 190 includes winches or other means, connected to the first and second upper control lines 175 and 176, for controlling the first and second upper control lines 175 and 176 independently of each other. The swivel 191 allows the driven element 165 to rotate without twisting the tow line 105.

The control module 190 includes instrumentation such as listed above and a power supply such as battery for powering the winches and the instrumentation. The control module 190 includes a wireless link for remote control and can also include sensors that measure the tension on the first and second upper control lines 175 and 176 and the lower control line 189. Ground instrumentation, including cameras can also be used to sense the precise position and orientation of the driven element 165. The swivel 191 can incorporate or include a small electrical generator 192, that is turned by rotation of the driven element 165 relative to the tow line 105, to provide power to the power supply. A stabilizer 193, in the form of a weight, as shown, or a fin, is suspended from the tow line 105 below the swivel 191, as a means for preventing the tow line from twisting when the driven element 165 rotates. Alternatively, two independently controlled lines can connect to the trailing edge 167 with at least one other line connecting to the leading edge 166.

Figure 25:
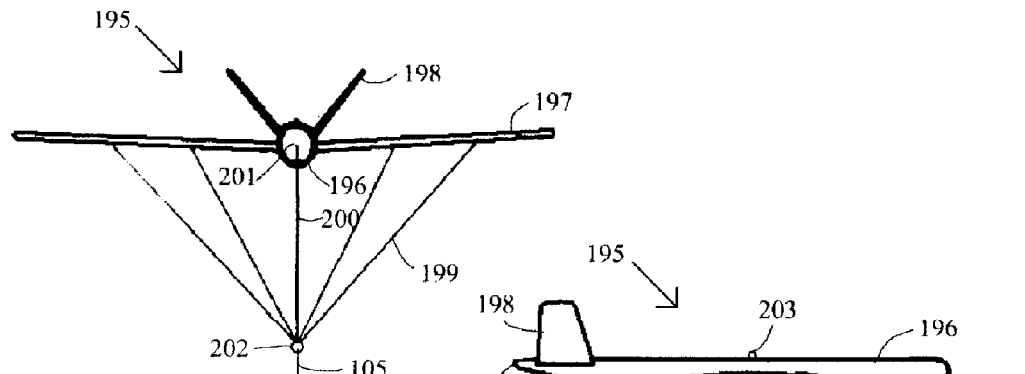
FIG. 25 is front view of another driven element for the revolving apparatus of FIG. 18.
Figure 26:
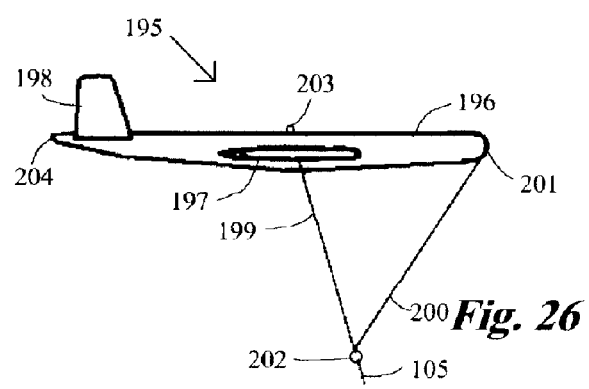
FIG. 26 is a side view of the driven element of FIG. 25.

FIGS. 25 and 26 show another driven element 195 that generally resembles a rigid wing aircraft. The driven element 195 has a small diameter, elongated fuselage 196 and a pair of laterally extending, rigid, airfoil shaped wings 197 on opposite sides of an intermediate portion of the fuselage 196. A spaced pair of control surfaces 198 extend upwardly and laterally outwardly from the tail 204 of fuselage 196. Alternatively, a conventional elevator and rudder configuration can be used at the tail 204 of the driven element 195. A plurality of laterally spaced bridle lines 199 attach to the underside of the wings 197 and fuselage 196.

A control line 200 extends from the nose 201 of the fuselage 196. A winch inside the fuselage 196 reels the control line 200 in and out. The interior of the fuselage also contains instrumentation such as set forth above. The bridle lines 199 and the control line 200 converge to connect to a swivel 202 that connects to the tow line 105. An attachment point 203 on the fuselage 196 above the wings 197 facilitates stacking of the driven elements 195. The control surfaces 198 and control line 200 provide means for adjusting the azimuth and elevation angles of the driven element 195. The control line 200 is a means for changing the driven element 195 between high force and low force configurations, and is reeled in until the fuselage 196 is substantially parallel to the tow line 105, to change the driven element 195 to a low force configuration.

Figure 27:
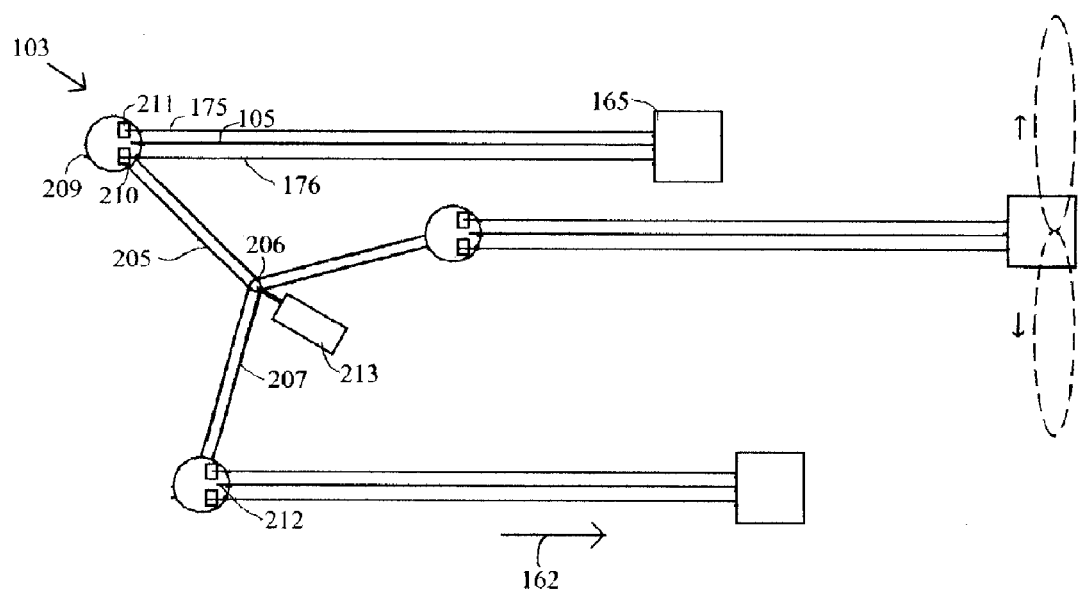
FIG. 27 is a top plan view of another revolving apparatus of the system of FIG. 13.

FIG. 27 shows an aerial wind power generation system 103 with another revolving apparatus 205 having a center 206 with three equally spaced bars 207 projecting horizontally from the center 206. The revolving apparatus 205 is mounted to rotate about the center 206. A turntable 209 is rotatably mounted about a vertical axis at the end 210 of each bar 207. A pair of winches 211 mount on each turntable 209. The first and second upper control lines 175 and 176 each connect to a winch 211. The tow line 105 attaches at the tow line attachment point 212 on the turntable 209 downwind of the winches 211. A means for generating power 213 is linked to and driven by the revolving apparatus 205.

Winches 211 independently control the lengths of the first and second upper control lines 175 and 176, and thereby form a means for independently adjusting the elevation and azimuth angles of the driven element 165. Through adjustment of the elevation and azimuth angles, the direction of the lift of the driven element 165 is adjusted. If the lift perpendicular to the tow line 105 is greater than the drag perpendicular to the tow line 105, the driven element 165 will accelerate perpendicular to the tow line 105. The driven element 165 can be flown at a selected speed perpendicular to the tow line 105, and can be flown in a selected pattern, by constant adjustment of the lengths of the control lines.

The lift of the driven element 165 is proportional to the square of the velocity of the apparent wind flowing perpendicular to the upper spar 168. The velocity of the apparent wind flowing perpendicular to the upper spar 168 will generally increase as the velocity of the driven element 106 perpendicular to the tow line 105 increases. By adjusting the elevation and azimuth angles of the driven element 165 the driven element 165 can be flown in a circle at high speed. The forces are balanced with inwardly directed force providing centripetal acceleration, forwardly directed force balancing with the drag, and the force parallel to the tow line 105 providing the force that pulls on the revolving apparatus 205.

To prevent tangling, when the first and second upper control lines 175 and 176, and the tow line 105, all attach to the turntable 209, the driven element 165 is flown in a pattern of two connected circles, as shown, flying clockwise through one circle and counter-clockwise through the other circle. By flying the driven element 165 through the pattern at high speed, the total lift and the lift parallel to the tow line 105 are increased, increasing the power generated by the aerial wind power generation system 103.

Figure 28:
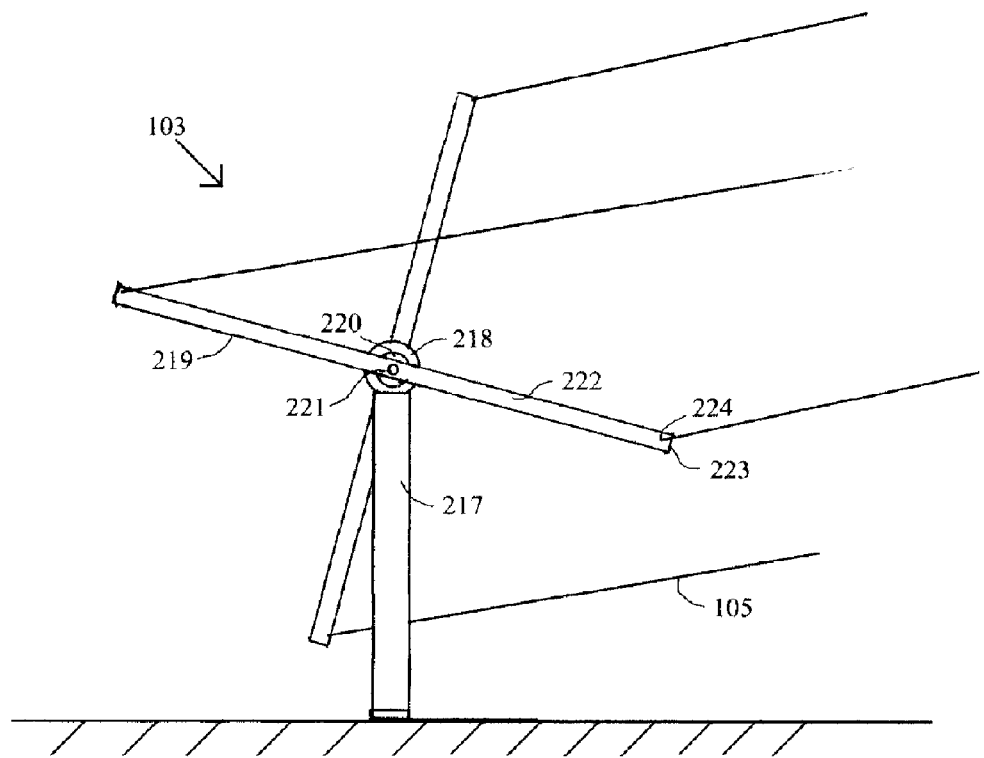
FIG. 28 is a side elevation view of another revolving apparatus of the system of FIG. 13.

Referring to FIG. 28, another variation of the aerial wind power generation system 103 has an elongated, substantially vertical tower 217, a nacelle 218 rotatably mounted about a vertical axis on top of the tower 217, a revolving apparatus 219, and a means for generating power 220. The revolving apparatus 219 has a shaft 221 that is rotatably mounted on and extends horizontally though the nacelle 218. A beam 222 is rigidly mounted on the shaft 221 on each side of the nacelle 218, each beam 222 extending in both directions perpendicular to the shaft 221 to ends 223. The two beams 222 are mounted on the shaft 221 at right angles to each other. A tow line attachment point 224 is provided at each end 223 of each beam 222. Tow lines 105 connect from the tow line attachment points 224 to the driven elements 145. The means for generating power 220 is mounted in the nacelle 218 and driven by rotation of the shaft 221. The azimuth angles of the driven elements 145 are adjusted such that the driven elements 145 fly slightly off to the sides, to prevent tangling of the tow lines 105.

Figure 29:
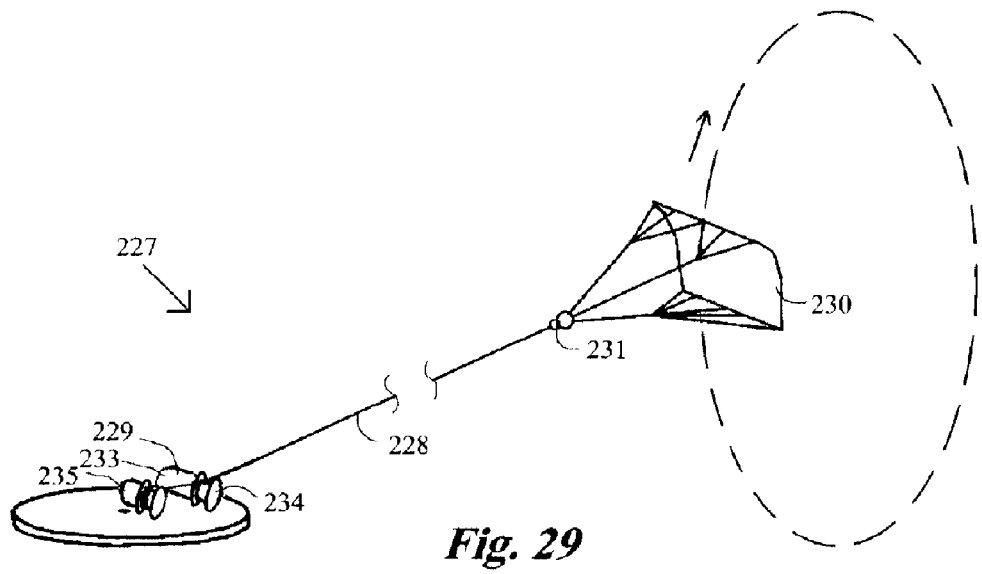
FIG. 29 is a perspective view of another aerial wind power generation system embodying features of the present invention.

FIG. 29 shows another power generation system 227 having a tow line 228 connected to a means for generating power 229 at one end and to a driven element 230 by a swivel 231 at the opposite end. The driven element 230 includes means for changing the driven element 230 between high force and low force configurations, and means for adjusting the azimuth and elevation angle of the driven element 230. The driven element 230 can be similar to the driven element 165 as shown in FIG. 24, driven element 195 as shown in FIGS. 25–26, or other driven element with means for adjusting the elevation and azimuth angles.

The means for generating power 229 includes a generator 233 connected to a capstan 234. A winch 235 is provided behind the capstan 234 for reeling the tow line 228. The tow line 228 is wrapped around the capstan 234 and turns the capstan 234 to turn the generator 233. The arrangement with a separate capstan 234 and winch 235 prevents excess tension on the wraps of tow line 228 on the winch. The driven element 230 is flown at a high velocity perpendicular to the tow line 228 in a generally circular pattern while the tow line 228 pulls out from the means for generating power 229, forming a corkscrew flight path. When the tow line 228 extends to a predetermined distance, the driven element 230 is changed to a low force configuration and reeled back towards the means for generating power 229. By flying the driven element 230 through the pattern at high speed, the total lift and the lift parallel to the tow line 228 are increased, increasing the power generated by the aerial wind power generation system 227.

Figure 30:
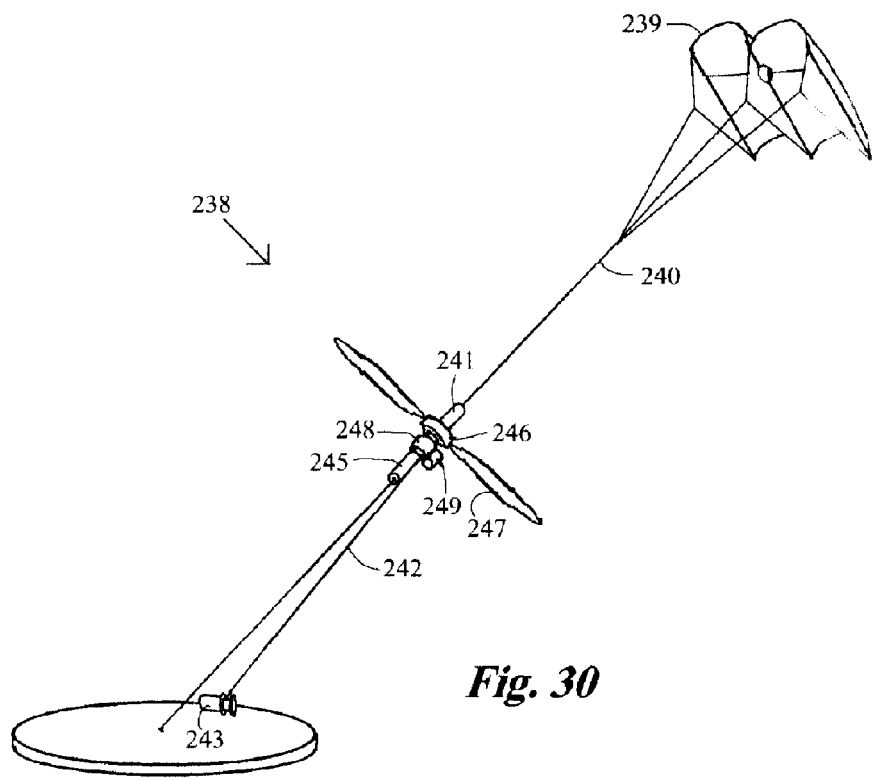
FIG. 30 is a perspective view of another aerial wind power generation system embodying features of the present invention.

Referring to FIG. 30, another power generation system 238 includes a support body 239, a guide line 240, a driven element 241, a tow line 242, and a means for generating power 243. The guide line 240 is tethered at one end at the ground or to a structure, and extends skywardly at a selected elevation angle with the other end being attached to the support body 239. The tow line 242 is connected to and drives the means for generating power 243.

The driven element 241 has a sleeve 245, a hub 246, a plurality of airfoil blades 247, and a pitch control mechanism 248. The sleeve 245 is slidably mounted on the guide line 240 and connected to one end of the tow line 242. The hub 246 is rotatably mounted on the sleeve 245. The blades 247 preferably have a twisted shape as in propeller or wind turbine rotor blades. The blades 247 are circumferentially spaced on the hub 246 and extend radially therefrom in a plane perpendicular to the guide line 240. The pitch control mechanism 248 links to the blades 247, providing a means for adjusting the pitch of the blades 247 and a means for changing the driven element 241 between high force and low force configurations.

The pitch control mechanism 248 can be controlled by a remote control module 249 mounted on the sleeve 245, as shown, and/or by other sensors such as an altimeter or GPS. The blades 247 are adjusted to spin in response to the wind to change the driven element 241 to a high or low force configuration. As the speed of the blades 247 increases, the direction of the lift from the blades 247 rotates towards the direction of the tow line 242, increasing the force in the direction of the tow line 242. The blades 247 are adjusted such that the lift and drag are minimized while the driven element 241 is in the low force configuration.

Figure 31:
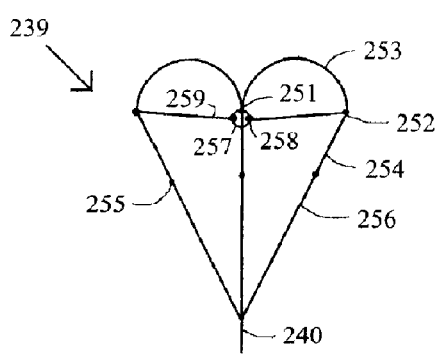
FIG. 31 is a front elevation view of a support body for the system of FIG. 30.
Figure 32:
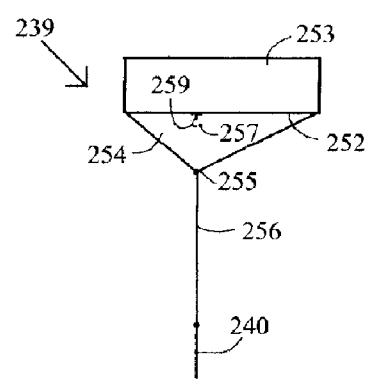
FIG. 32 is a side elevation view of the support body of FIG. 31.

Referring to FIGS. 31 and 32, the support body 239 is shaped generally like a double sled kite, having a longitudinal middle spar 251 between two spaced, longitudinal side spars 252, and a sail portion 253 connecting the middle and side spars 251 and 252. A triangular wing 254 extends downwardly from each of the middle spar 251 and side spars 252 to a corner 255. The corners 255 are closer to the front than the back of the support body 239. A bridle line 256 connects to each corner 255. The three bridle lines 256 converge and connect to the guide line 240.

A control module 257 mounts on the middle spar 251, forward of the centerline of the support body 239. The control module 257 includes two winches 258. Each winch 258 has a control line 259 that connects to a side spar 252. The control lines 259 can pull the side spars 252 inwardly to change the shape of the support body 239. Pulling inwards with one control line 259 causes the support body 239 to fly to one side. Pulling inwards or reeling out both control lines 259 changes the lift and drag of the support body 239. The instrumentation in the control module 257 can provide automatic correction and/or the instrumentation can be remotely controlled. The instrumentation in the control module 257 can provide self-stabilization of the support body 239 in response to wind fluctuation.

Other configurations can be used for the support body 239 and the first and second support bodies 15 and 72, described above. By way of example and not as a limitation, the designs of the driven elements that include azimuth and elevation angle adjustment can be used as support bodies, including the driven element 145, shown in FIGS. 19 and 20, the driven element 165, shown in FIGS. 21–24 and the driven element 195, shown in FIGS. 25 and 26. Similarly, a support body such as the support body 239, as shown in FIGS. 31 and 32, that can be changed between high force and low force configurations, is also suitable for use as a driven element. Although the driven elements and support bodies are each generally shown and described herein as a single element, the driven elements and support bodies can each be implemented in trains of two or more units.

Although the present invention has been described with a certain degree of particularity, it is understood that the present disclosure has been made by way of example and that changes in details of structure may be made without departing from the spirit thereof.

What is claimed is:

1. An aerial power generation system for generation of power from the wind, comprising:
    a plurality of aerial wind powered driven elements, each driven element having a high force configuration and a low force configuration, each driven element including, when in said high force configuration, an airfoil shape, an elevation angle and an azimuth angle,
    a tow line for each driven element, each said tow line having an upper end connected to a driven element and a lower end spaced from said upper end,
    means for adjusting independently said elevation and azimuth angles,
    a revolving apparatus with a center and having a tow line attachment point for each driven element, said lower end of each said tow line being attached to a separate tow line attachment point, said tow line attachment points being linked together, spaced from said center and spaced from each other, and
    means, linked to said revolving apparatus and driven thereby, for generating power,
    whereby said means for adjusting adjusts said elevation and azimuth angles on each driven element to fly each driven element in a selected pattern at a high velocity perpendicular to said tow line, when each driven element is in said high force configuration, to increase the power generated.

2. The system as set forth in claim 1 including means for changing each driven element individually between high force and low force configurations,
    whereby said means for changing changes each driven element to said high force configuration for a selected portion of the rotation of the respective said tow line attachment point and changes each driven element to said low force configuration throughout the remainder of the rotation of the respective said tow line attachment point, so that said driven elements in said high force configuration pull on the respective said tow line attachment points and said driven elements in said low force configuration are pulled by the respective said tow line attachment points, causing said revolving apparatus to revolve and thereby driving said means for generating power.

3. The system as set forth in claim 1 wherein:
    each driven element includes a leading edge and a trailing edge, and
    said means for adjusting includes spaced, independently controlled first and second upper control lines attached to said leading edge of each driven element.

4. The system as set forth in claim 3 wherein said upper end of said tow line attaches to said trailing edge of each driven element.

5. The system as set forth in claim 4 wherein said revolving apparatus includes a turntable at each said tow line attachment point, said turntable having two winches with said first and second upper control lines each connecting to a said winch.

6. The system as set forth in claim 3 wherein said means for adjusting includes a control module and a lower control line with said first and second upper control lines attaching to said control module, said lower control line attaching to said trailing edge and to said control module and said control module attaching to said upper end of said tow line.

7. The system as set forth in claim 1 wherein each said driven element includes an upper spar, a lower spar spaced from said upper spar, a sail portion extending between said upper and lower spars, and a plurality of spaced, shaped battens attached to said sail portion and extending perpendicular to said upper spar, whereby said battens curve said sail portion into said airfoil shape when each driven element is in said high force configuration and flatten said sail portion when each driven element is in said low force configuration.

8. The system as set forth in claim 1 wherein each driven element includes a small diameter, elongated fuselage having a nose and a tail, a pair of laterally extending, rigid, airfoil shaped wings on opposite sides of said fuselage, a spaced pair of control surfaces extending upwardly and laterally outwardly from said tail, a plurality of bridle lines connected to said fuselage and said wings, an adjustable length control line extending from said nose, and a swivel connected to said bridle lines and said control line opposite said fuselage, said upper end of said tow line connecting to said swivel.

9. A method of generating power from the wind comprising the steps of:

providing a plurality of aerial wind powered driven elements each having high force configurations and low force configurations, and a separate tow line connected to each driven element, said driven elements each having, when in a said high force configuration, an airfoil shape, an elevation angle and an azimuth angle, providing a revolving apparatus and means, linked to said revolving apparatus and driven thereby, for generating power, said revolving apparatus being rotatably mounted about a center and having a tow line attachment point, for each driven element, said tow line attachment points each being connected to a said tow line, said tow line attachment points being linked together, spaced from said center and spaced from each other, changing each driven element to a high force configuration for a selected portion of the rotation of the respective said tow line attachment point, changing each driven element to a low force configuration for the remainder of the rotation of the respective said tow line attachment point, and adjusting said elevation angle and said azimuth angle of each driven element to fly said driven element at a high speed in a selected pattern perpendicular to said tow line, when said driven element is in a high force configuration, whereby said driven elements, in response to the wind, rotate said revolving apparatus when in said high force configuration.

\* \* \* \* \*

UNITED STATES PATENT AND TRADEMARK OFFICE
CERTIFICATE OF CORRECTION

PATENT NO.        : 7,188,808 B1                                    Page 1 of 1
APPLICATION NO.   : 11/307890
DATED             : March 13, 2007
INVENTOR(S)       : Gaylord G. Olson It is certified that error appears in the above-identified patent and that said Letters Patent is hereby corrected as shown below:

On the title page, item (54), and Column 1, line 1 change "AERIALWIND" to -- AERIAL WIND --.

Signed and Sealed this

Twenty-seventh Day of November, 2007

JON W. DUDAS
*Director of the United States Patent and Trademark Office*